(12) United States Patent
Monestier et al.

(10) Patent No.: US 10,208,929 B2
(45) Date of Patent: Feb. 19, 2019

(54) LED LIGHTING ARRANGEMENT

(71) Applicant: Lumileds Holding B.V., Schiphol (NL)

(72) Inventors: Florent Monestier, Aachen (DE); Benno Spinger, Aachen (DE)

(73) Assignee: Lumileds Holding B.V., Schiphol (NL)

(*) Notice: Subject to any disclaimer, the term of this patent is extended or adjusted under 35 U.S.C. 154(b) by 0 days.

(21) Appl. No.: 15/921,939

(22) Filed: Mar. 15, 2018

(65) Prior Publication Data

US 2018/0266663 A1 Sep. 20, 2018

(30) Foreign Application Priority Data

Mar. 17, 2017 (EP) ...................... 17161501

(51) Int. Cl.
*F21S 8/00* (2006.01)
*F21V 17/06* (2006.01)
*F21V 29/10* (2015.01)
*F21K 9/60* (2016.01)
*B23P 19/04* (2006.01)
(Continued)

(52) U.S. Cl.
CPC .............. *F21V 17/06* (2013.01); *B23P 19/04* (2013.01); *F21K 9/60* (2016.08); *F21K 9/90* (2013.01); *F21V 29/00* (2013.01); *F21V 29/10* (2015.01); *F21V 17/02* (2013.01); *F21V 29/83* (2015.01); *F21Y 2115/10* (2016.08)

(58) Field of Classification Search
CPC .......... F21V 17/06; F21V 17/02; F21V 17/00; F21V 29/00; F21V 29/504; F21V 29/505; F21V 29/83; F21K 9/60; F21K 9/68; F21K 9/69; F21K 9/233

USPC ......................................... 362/278, 277, 294
See application file for complete search history.

(56) References Cited

U.S. PATENT DOCUMENTS 4,884,869 A 12/1989 Uemura
2002/0044456 A1 4/2002 Balestriero et al.
(Continued)

FOREIGN PATENT DOCUMENTS

JP H11213733 A 8/1999
WO 2012048281 A1 4/2012

OTHER PUBLICATIONS

Extended European Search Report dated Jun. 20, 2017 from European Patent Application No. 17161501.6 filed Mar. 17, 2017, 4 pages.

*Primary Examiner* — Bryon T Gyllstrom
*Assistant Examiner* — James M Endo

(57) ABSTRACT

A lighting arrangement and a method for manufacturing the lighting arrangement are provided. The lighting arrangement has a holder to carry an optical element above a LED lighting element. The holder has an optical sub-holder and a connecting sub-holder connecting the optical sub-holder with a support member, where the LED lighting element is arranged on. The optical sub-holder has at least one stress release element dividing the optical sub-holder in one or more outer parts connected to the connecting sub-holder and a main part carrying the optical element, where a mechanical connection between the main part and the one or more outer parts is weakened by the stress release element extending through the optical sub-holder to enable the one or more outer parts to deform freely in case of thermal stress while maintaining the main part closer to the desired position compared to the one or more outer parts.

16 Claims, 5 Drawing Sheets

(51) Int. Cl.
*F21K 9/90* (2016.01)
*F21V 29/00* (2015.01)
*F21V 17/02* (2006.01)
*F21V 29/83* (2015.01)
*F21Y 115/10* (2016.01)

(56) References Cited

U.S. PATENT DOCUMENTS

| | | | |
|---|---|---|---|
| 2002/0113244 A1 | 8/2002 | Barnett et al. | |
| 2008/0123341 A1* | 5/2008 | Chiu | F21K 9/233 362/294 |
| 2009/0180287 A1* | 7/2009 | Tang | F21K 9/68 362/351 |
| 2009/0323331 A1* | 12/2009 | Louh | F21V 29/004 362/235 |
| 2010/0033971 A1* | 2/2010 | Lu | F21V 7/09 362/294 |
| 2010/0149494 A1* | 6/2010 | Kawachi | H05B 33/0803 353/57 |
| 2010/0165630 A1* | 7/2010 | Lin | F21K 9/233 362/294 |
| 2011/0032707 A1* | 2/2011 | Takashige | F21V 5/04 362/277 |
| 2011/0051423 A1* | 3/2011 | Hand | F21K 9/00 362/294 |
| 2011/0181165 A1* | 7/2011 | Lin | F21K 9/233 313/46 |
| 2012/0140489 A1* | 6/2012 | Chung | F21V 3/02 362/368 |
| 2012/0187836 A1* | 7/2012 | Hashimoto | F21V 5/04 315/51 |
| 2013/0141908 A1* | 6/2013 | Rodriguez | F21V 5/007 362/240 |
| 2014/0091697 A1* | 4/2014 | Shum | F21V 5/04 313/46 |
| 2014/0168968 A1* | 6/2014 | Streppel | F21V 5/04 362/235 |
| 2014/0217880 A1* | 8/2014 | Tanaka | F21V 17/101 313/110 |
| 2017/0073048 A1 | 3/2017 | Butcher | |

* cited by examiner

LED LIGHTING ARRANGEMENT

CROSS-REFERENCE TO RELATED APPLICATIONS

The present application claims priority to European Patent Application No. 17161501.6 filed on Mar. 17, 2017 and titled "LED LIGHTING ARRANGEMENT". European Patent Application No. 17161501.6 is incorporated herein.

FIELD OF THE INVENTION

The invention relates to a lighting arrangement comprising a specific holder to carry an optical element above a LED lighting element and to a method for manufacturing the lighting arrangement.

BACKGROUND OF THE INVENTION

Lighting arrangements with LEDs are used for an ever-increasing number of lighting applications. In many cases, an optical element is arranged in front of an LED to alter the light emission, such as e.g. a lens, a reflector and/or a collimator to obtain an emitted light beam of desired properties. The properties of the emitted light may depend on the exact positioning of the optical element relative to the LED. An exact and stable positioning of the optical element relative to the LED is essential to maintain stable emission properties over a wide range of operating conditions. In case of providing a stable position by bringing the LEDs and the optical element in direct contact, there is a high risk of brittle failure of the LED material. Therefore, any contact between LEDs and optical elements are commonly prevented by certain holders providing a gap between optical element and LED emitting surface, where the structure should be stable in the range of a few micrometers.

Thermal changes, e.g. due to a change in ambient temperature or due to LED electrical operating power dissipated as heat, significantly influence such a holding structure provided to mount an optical element relative to an LED. In particular, if the structure supporting the LED and the optical element is comprised of different parts or different materials with a differing coefficient of thermal expansion (CTE), the structure may undergo distortions during negative or positive temperature increment that could lead to variations in the relative arrangement of the LED and the optical element.

It would be desirable to provide a lighting arrangement with improved thermal stability of the positioning of the optical element having relatively low temperature sensitivity over a wide range of operating condition even for significant mismatches of the coefficients of thermal expansion of the materials of the components of the lighting arrangement.

SUMMARY OF THE INVENTION

It is an object of the present invention to provide a lighting arrangement with improved thermal stability of the positioning of the optical element having relatively low temperature sensitivity over a wide range of operating condition even for significant mismatches of the coefficients of thermal expansion of the materials of the components of the lighting arrangement. Typical lighting arrangements comprise optical elements arranged in front of the light sources of the lighting arrangement, where the desired performance of the optical elements depends on the correct distance between optical element and light source. However thermal stress induced by varying operating conditions may cause variations of the distance between optical element and light source. Lighting arrangements suitable to keep the distance variation as small as possible provide a reliable and good optical performance of the lighting arrangement.

The invention is defined by the independent claims. The dependent claims define advantageous embodiments.

According to a first aspect a lighting arrangement is provided. The lighting arrangement comprises at least one LED lighting element arranged on a support member, at least one optical element to receive light emitted from the LED lighting element and a holder comprising an optical sub-holder and a connecting sub-holder connecting the optical sub-holder with the support member, where the connecting sub-holder is suitably shaped that the optical sub-holder bridges the connecting sub-holder to hold the optical element in a desired position relative to the LED lighting element suitable to shape the received light in a desired way, wherein at least the optical sub-holder comprises at least one stress release element dividing the optical sub-holder in one or more outer parts connected to the connecting sub-holder and a main part carrying the optical element, where a mechanical connection between the main part and the one or more outer parts is weakened by the stress release element extending through the optical sub-holder and having a suitable shape and length to maintain the required mechanical connection between the main part and the one or more outer parts suitable to carry the main part and to enable the one or more outer parts to deform freely in case of thermal stress while maintaining a main part position of the main part being closer to the desired position compared to an outer part position of the one or more outer parts.

The term "lighting arrangement" denotes any assembly of components at least suitable to emit light. The lighting arrangement may be adapted to be connected to a operating and controlling unit or may comprise further components to control the light emission and/or supply energy to operate the lighting arrangement.

The term "LED lighting element" denotes any type of solid state lighting element, such as e.g. light emitting diodes, organic light emitting diodes, laser diodes, etc. A LED lighting element may comprise a single or a plurality of such solid-state lighting elements, e.g. one or a plurality of light emitting diodes arranged in close proximity in an emitting array.

The term "support member" denotes any suitable substrate where the LED lighting element is mounted to. In an embodiment the support member might by a printed circuit board (PCB) adapted to operate the lighting arrangement, e.g. a Cu IMS board with a coefficient of thermal expansion of 16 ppm/° C.

The term "optical element" denotes any type of element with an optical function, in particular to alter the beam of light emitted from the LED lighting element. The optical element may thus comprise or be comprised of a reflector, a collimator, a lens, an optical filter, a baffle, etc, or a combination thereof. The optical element receives light from the LED lighting element in order to emit a modified beam, which may be e.g. focused, collimated, redirected, reflected, filtered etc. Optical elements may comprise or consist of silicone, e.g. a silicone lens having a coefficient of thermal expansion of 250 ppm/° C.

The term "holder" denotes a structure providing a mechanical connection between the optical element and the support member where the LED lighting element is mounted. The distance between the optical element and the emitting surface of the LED lighting element is defined by the mechanical construction of the holder, where the holder is designed as not to disturb the light path from the LED lighting element through the optical element to the environment. As an example, the holder may comprise or consist of LCP having a coefficient of thermal expansion of 12 ppm/° C. providing sufficiently mechanical strength to hold the optical element.

The term "bridges" denotes an arrangement of the connecting sub-holder and the optical sub-holder, where the connecting sub-holder is arranged outside the path of light and the optical sub-holder is supported by different parts of the connecting sub-holder while all together carrying the optical holder above the LED lighting element, where the optical sub-holder is not directly connected to the support member. The connecting sub-holder can be made of any material stable at high temperature, e.g. at 150° C., without or with low outgassing and with high stiffness, typically with E modulus higher than 1 GPa.

The term "stress release element" denotes any arrangements suitable to weaken a mechanical connection between neighbored parts (here main part and adjacent outer part) within the optical sub-holder. The term "weaken" considers the requirement of maintaining a mechanical connection between neighbored parts in order to connect these parts to the connecting sub-holder, but decouples neighbored parts within a wide range of the optical sub-holder. Therefore, the mechanical connection between main part and outer part(s) is still there but not as strong as in case of a present stress release element compared to an optical sub-holder without a stress release element. Examples for stress release elements are cuts, slits or openings through the optical sub-holder.

In order to provide a stable position of the optical element, the main part of the optical sub-holder is connected via a mechanical connection to the connecting sub-holder at least via the outer parts of the optical sub-holder. However, the mechanical connection is limited to small bars or bridges between the main part and the outer parts preferably arranged at the rim or close to the outer area of the optical sub-holder in order to prevent a fixed mechanical connection between the main part and the outer part in an area directly above or close to the optical element in a lateral direction parallel to the surface of the support member. This enables the outer parts of the optical sub-holder connected to the connection holder to deform more or less freely, where this deformation is not transferred to the main part of the optical sub-holder or at least strongly reduced.

The special design of the optical holder leads to a release of compressive stress on the outer part of the optical sub-holder by introducing the stress release elements within the optical sub-holder. As a result, vertical displacements of the optical element due to induced thermal stress caused by varying operation conditions can be reduced by at least a factor of 10 compared to holders according to prior art. A short distance between LED lighting element and optical element is required to reduce optical losses. The special design of the optical sub-holder enables the arrangement of the optical element in such a short distance over a wide range of operation conditions with simultaneously preventing any contact between LED lighting element and optical elements in case of varying operation conditions. Therefore, the special design of the optical sub-holder in the lighting arrangement according to the present invention provides a lighting arrangement with improved thermal stability of the positioning of the optical element having relatively low temperature sensitivity over a wide range of operating condition even for significant mismatches of the coefficients of thermal expansion of the materials of the components of the lighting arrangement.

The lighting arrangement may be arranged in such a way that the stress release element is established by at least one open slit arranged between the main part and the connecting sub-holder. Slits instead of cuts fully decouples the main part from the outer part along the length of the slit of a certain width. Instead of this a cut destroys the direct mechanical connection between adjacent parts but does not introduce a gap between adjacent parts. Therefore, friction forces between adjacent parts may transmit vertical displacements to a certain extend to the neighbored part. The imaging device may be arranged in such a way that the slit has a width ranging between 100 µm and 5 mm providing a even better mechanical decoupling between main and outer parts.

The lighting arrangement may be arranged in such a way that the width of the slit varies along the length of the slit. A varied width along the length of the slit as the stress release element can be used to control lateral displacements of different optical elements arranged adjacent to each other on the same optical sub-holder to maintain constant gaps between these different optical elements.

The lighting arrangement may be arranged in such a way that the slit is a vertical slit through the optical sub-holder. With a vertical slit the vertical displacements of the outer parts cannot affect the position of the main part of the optical sub-holder.

The lighting arrangement may be arranged in such a way that the stress release element comprises at least two separate slits arranged on both sides of the area of the optical sub-holder carrying the optical element, preferably each slit being arranged in parallel to an edge of the connecting sub-holder holding the optical sub-holder facing towards the optical element. The two slits decouple the main part of the optical sub-holder from the outer parts being connected to the connecting sub-holder on both sides of the main part. In this embodiment, the vertical displacement of the main part of the optical sub-holder due to thermal stress is further reduced.

The lighting arrangement may be arranged in such a way that the stress release element further extends at least partly into the connecting sub-holder in order to reduce the amount of vertical displacement introduced into the outer parts of the optical sub-holder from the connecting sub-holder.

The lighting arrangement may be arranged in such a way that the optical element is at least partly made of a transparent or translucent material in order to be able to pass the light emitted from the LED lighting element at least partly through the optical element to the environment in a desired light beam direction.

The lighting arrangement may be arranged in such a way that the optical element is arranged directly in front of a light emitting surface of the LED lighting element at a first distance, preferably along an optical axis along a main emission direction, to minimize light losses by light not entering into the optical elements.

The lighting arrangement may be arranged in such a way that the optical element comprises two or more element parts each serving specific beam shaping functions, wherein also the specific element parts are separated from each other by the stress release element. In this case, the target is to place the element parts of the optical element as close as possible to each other, e.g. in order to focus the light as well as possible with a common $2^{nd}$ element part. But in this case, direct contact between element parts has to be prevented to not mix the light between each functional part. A possible application of this configuration is a system where the high beam and low beam light functions are extracted from different element parts of the optical element. The corresponding lighting arrangement is even more efficient as it allows to reduce the lateral displacement and therefore to prevent contact between high and low beam element parts.

The lighting arrangement may be arranged in such a way that the connecting sub-holder provides a supporting surface for the optical sub-holder, which is arranged at least on opposite sides of the LED lighting element in lateral direction parallel to the surface of the support member. This arrangement simplifies bridging of the optical sub-holder.

The lighting arrangement may be arranged in such a way that the connecting sub-holder, the optical sub-holder and the optical element are provided as a single piece element made of the same material, e.g. made of silicone. A single piece element makes manufacturing more easily. However, without the inventive concept of introducing a stress release element such a single piece element would be very sensible to temperature variations. This is not the case of a single piece element comprising a stress release element according to the present invention.

According to a second aspect a method to manufacture a lighting arrangement is provided. The method comprises the steps of Providing a support member carrying at least one LED lighting element, Providing an optical sub-holder carrying at least one optical element to receive the light emitted from the LED lighting element, Connecting the optical sub-holder via a connecting sub-holder to the support member, where the optical sub-holder and the connecting sub-holder forming a holder, where the connecting sub-holder is suitably shaped that the optical sub-holder bridges the connecting sub-holder to hold the optical element in a desired position relative to the LED lighting element suitable to shape the received light in a desired way, Introducing at least one stress release element into the optical sub-holder dividing the optical sub-holder in one or more outer parts connected to the connecting sub-holder and a main part carrying the optical element, where a mechanical connection between the main part and the one or more outer parts is weakened by the stress release element extending through the optical sub-holder and having a suitable shape and length to maintain the required mechanical connection between the main part and the one or more outer parts suitable to carry the main part and to enable the one or more outer parts to deform freely in case of thermal stress and to maintain a main part position of the main part being closer to the desired position compared to an outer part position of the one or more outer parts.

The method may be performed in such a way that the step of introducing the stress release element is performed after having connected the optical sub-holder to the connecting sub-holder. Here additional stress introduced by the procedure of fixing the optical sub-holder to the connecting sub-holder can be released by introducing the stress release element and therefore cannot further contribute to any vertical displacements later on, leading to an even more stable position of the optical element relative to the LED lighting element.

The method may be performed in such a way that the stress release element is also introduced at least partly into the connecting sub-holder.

The method may be performed in such a way that the holder is manufactured via injection moulding, transfer moulding or stamping in order to manufacture the holder with a low-cost process. As an example, for injection molding, a thermal curing polymer is introduced in a cavity mold which has the negative shape of the targeted shape. To produce the slits, the cavity holding the thermal curing polymer is simply filled by material at the location corresponding to the slits.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principle sketch of a lighting arrangement according to prior art.

FIG. 2 shows a principle sketch of a lighting arrangement according to the present invention in a top view.

FIG. 3 shows a principle sketch of the lighting arrangement of FIG. 2 in a side view along section plane A-B (a) in case of no thermal stress and (b) in case of thermal stress induced by operating conditions.

FIG. 4 shows a principle sketch of another embodiment of the lighting arrangement according to the present invention in a top view.

FIG. 5 shows another embodiment of the lighting arrangement according to the present invention (a) in a perspective view and (b) in a top view of the optical sub-holder.

FIG. 6 shows the vertical displacement of lighting arrangements (a) according to prior art and (b) according to the present invention in a perspective view.

FIG. 7 shows an embodiment of the method to manufacture a lighting arrangement according to the present invention.

In the Figures, like numbers refer to like objects throughout. Objects in the Figs. are not necessarily drawn to scale.

DETAILED DESCRIPTION OF EMBODIMENTS

Various embodiments of the invention will now be described by means of the Figures.

Figure 1:
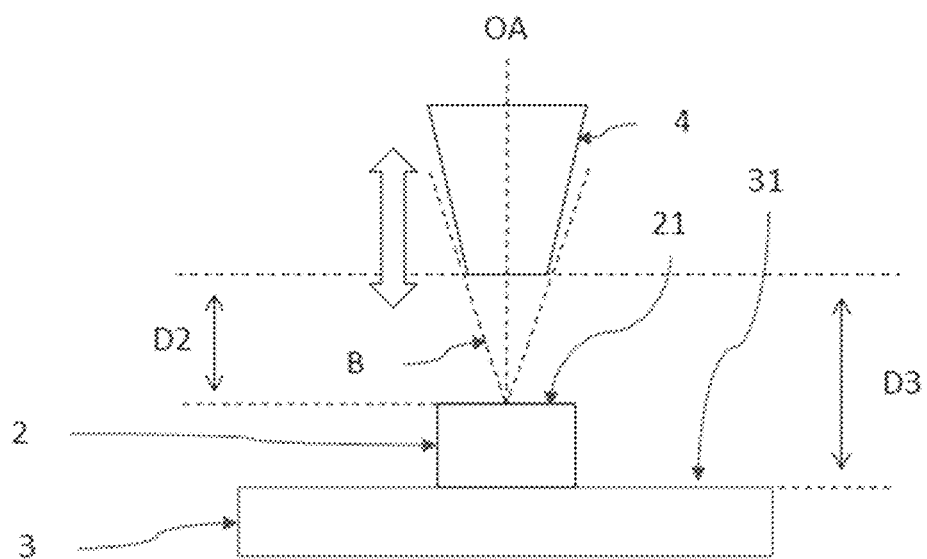

FIG. 1 shows a principle sketch of a lighting arrangement according to prior art comprising a LED lighting element 2 with a light emitting surface 21 arranged on a upper surface 31 of a support member 3, where a collimator as an optical element 4 is arranged above the light emitting surface 21 in order to receive light B emitted from the LED lighting element 2. The collimator 4 is carried by a holder not shown here. Typical distances are 100 μm for the distance D2 between light emitting surface 21 and collimator 4 and 500 μm for the distance D3 between upper surface 31 of the support member 3 and collimator 4. The amount of light B emitted from the LED lighting element 2 with an indicated emitting conus entering the collimator 4 depends on the distance D2. In case of vertical displacements (indicated by the large error) of the collimator 4 along the optical axis OA, the amount of light will vary leading to loss of non-collimated light missing the collimator 4 on both sides in case of an increased distance D2 and also due to the increase of rays hitting the internal collimators face with an angle higher than the critical internal reflection angle. A loss of light might be reduced in case of decreasing the distance D2.

However, due to vertical displacements the distance D2 may decrease to zero resulting in a contact between collimator 4 and the light emitting surface 21 eventually leading to damages of the LED lighting element 2. Therefore, a reliable distance is essential for the performance of a lighting arrangement, which can be achieved by the lighting arrangement according to the present invention comprising a holder with a specific design.

Figure 2:
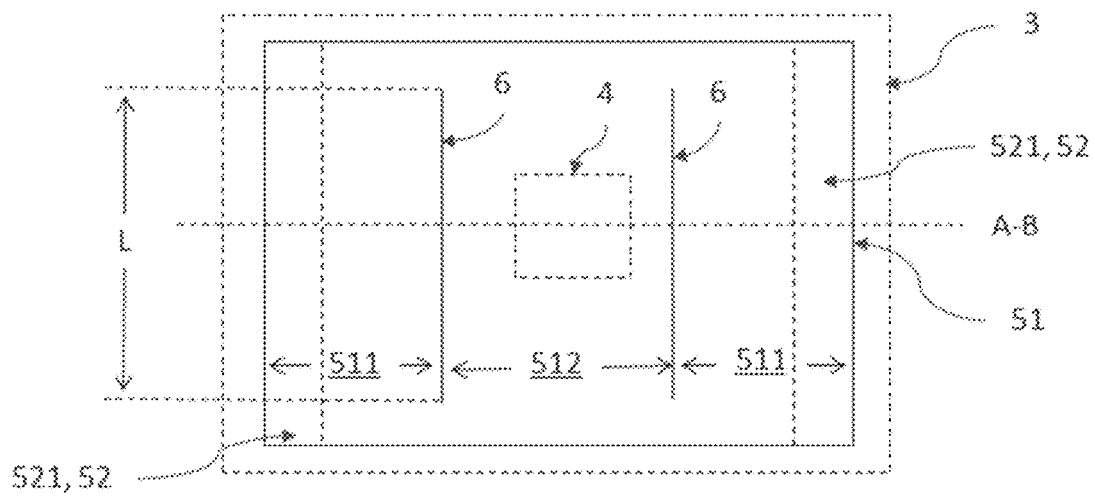
Figure 3:
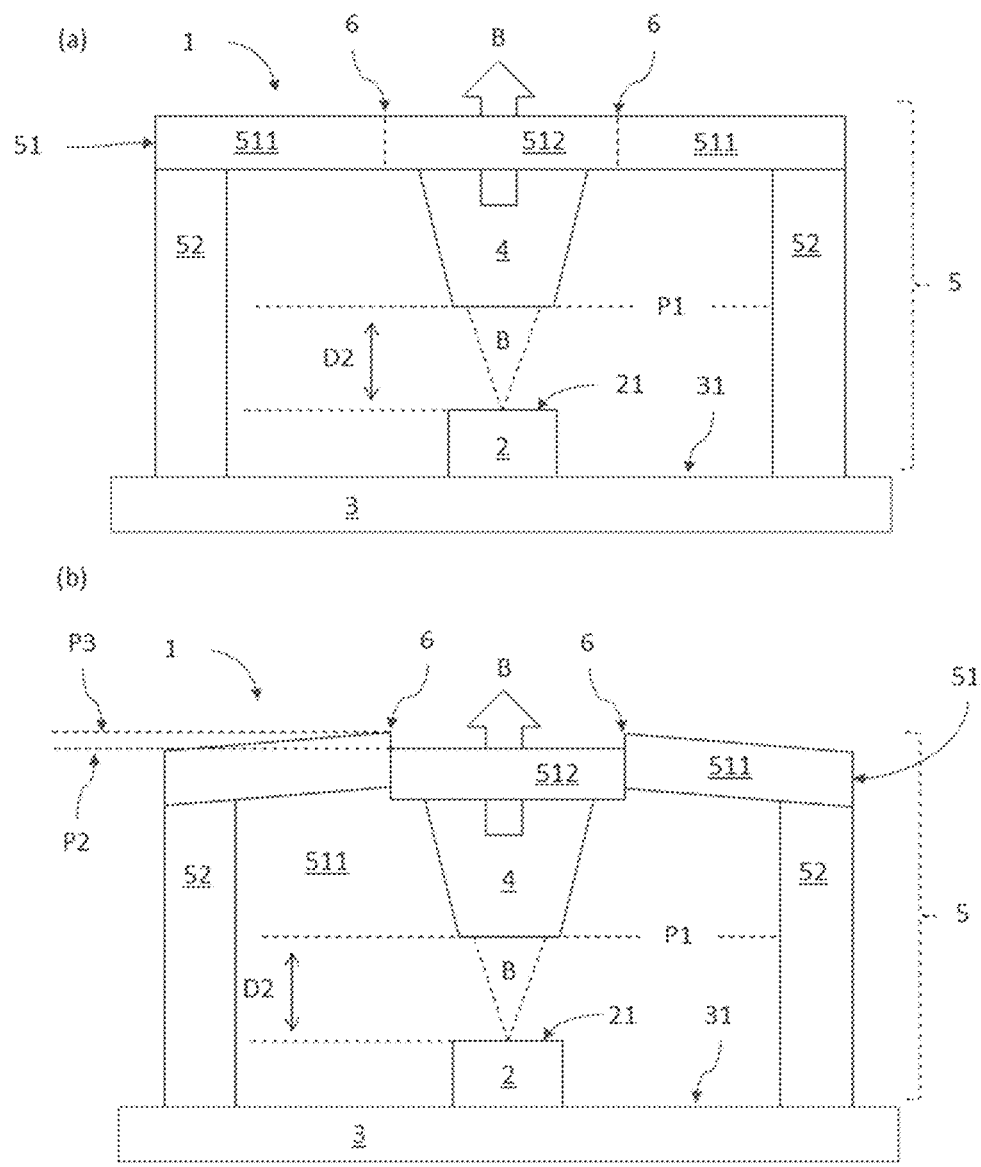

FIG. 2 shows a principle sketch of a lighting arrangement 1 according to the present invention in a top view, where the details between optical sub-holder 51 and support member 3 (dashed area underneath the optical sub-holder 51) are shown in FIG. 3. The holder 5 comprises an optical sub-holder 51 and a connecting sub-holder 52 connecting the optical sub-holder 51 with the support member 3, where, in this embodiment, the connecting sub-holder 52 comprises a left part and a right part arranged on opposite sides of the LED lighting element 2 in lateral direction parallel to the surface 31 of the support member 3 with each part of the connecting sub-holder having a supporting surface 521 to carry the optical sub-holder 51. When mounted on the supporting surfaces 521 the optical sub-holder 51 bridges the connecting sub-holder 52 to hold the optical element 4 (indicated as dashed square) in a desired position P1 above the LED lighting element 2. Here the optical sub-holder 51 comprises a stress release element 6 provided on each side of the optical element 4 between optical element and connecting sub-holder 52 dividing the optical sub-holder 51 in two outer parts 511 directly connected to the connecting sub-holder 52 and a main part 512 carrying the optical element 4, where a mechanical connection 53 between the main part 512 and the two outer parts 511 is weakened by the stress release element 6 extending through the optical sub-holder 51 as cuts (indicated by the solid lines) having a length L to maintain the required mechanical connection 53 between the main part 512 and the two outer parts 511 close to the edger of the optical sub-holder 51 to reliably carry the main part 512 and simultaneously to enable the two outer parts 511 to deform freely in case of thermal stress while maintaining a main part position P2 of the main part 512.

FIG. 3 shows a principle sketch of the lighting arrangement 1 of FIG. 2 in a side view along section plane A-B (a) in case of no thermal stress and (b) in case of thermal stress induced by operating conditions. In this embodiment the lighting arrangement 1 comprises one LED lighting element 2 arranged centrally on an upper surface 31 of a support member 3, one optical element 4 to received light B emitted from the LED lighting element 2 wherein the optical element 4 and the optical sub-holder 51 are at least partly made of a transparent or translucent material in order to emit light B to the environment. Here the optical element 4 is arranged directly in front of a light emitting surface 21 of the LED lighting element 2 at a first distance D2 along an optical axis OA along a main emission direction. The optical element 4 might be made of silicone. The advantage of this configuration is that the deformation of the holder 5 can be controlled by choosing holder material with CTE matching the board CTE. It would not be possible if the optical element 4 was supporting itself as usually the CTE of optical element is very high. The lighting arrangement 1 further comprises a holder 5 comprising an optical sub-holder 51 and a connecting sub-holder 52 connecting the optical sub-holder 51 with the support member 3, where the optical sub-holder 51 bridges the connecting sub-holders 52 right and left of the LED lighting element 2 to hold the optical element 4 in the desired position P1 relative to the LED lighting element 2 to shape the received light B in a desired way. The stress release element 6 divides the optical sub-holder 51 in two outer parts 511 connected to the connecting sub-holder 52 and a main part 512 carrying the optical element 4. The stress release element 6 (indicated by dashed lines) extend through the optical sub-holder 51 on both sides of the optical element 4 as a vertical cut. In case of no induced thermal stress (FIG. 2a) the outer parts 511 and the main part 512 have the same position (distance) to the surface 31 of the support member 3 or the light emitting surface 21 of the LED lighting element 2. In case of induced thermal stress (FIG. 2b) the stress release element 6 executed as cuts lead to a maintained main part position P2 of the main part 512, while the adjacent outer parts 511 of the optical sub-holder 51 left and right to the main part 511 are free to deform resulting in a vertical displacement to an outer part position P3 of the two outer parts 511, which has a larger vertical distance to the light emitting surface 21 as the main part at the main part position P2. The required mechanical connections 53 are located outside the section plane A-B and therefore not shown here.

Figure 4:
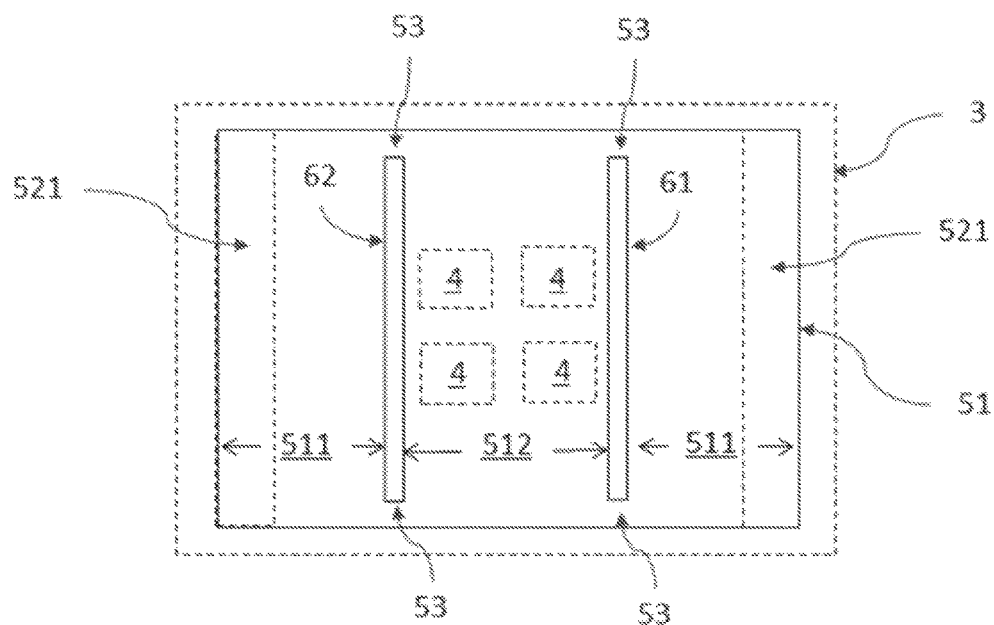

FIG. 4 shows a principle sketch of another embodiment of the lighting arrangement 1 according to the present invention in a top view, wherein the stress release element 6 is established by two open slits 61, 62 executed as vertical slits 61, 62 through the optical sub-holder 51. The slits may have a width W ranging between 100 μm and 5 mm. Here the two separate slits 61, 62 are arranged on both sides of the area of the optical holder 51 carrying four separate optical elements 4 (indicated by dashed square) in parallel to an edge of the connecting sub-holder 52 holding the optical sub-holder 51 facing towards the optical element 4.

Figure 5:
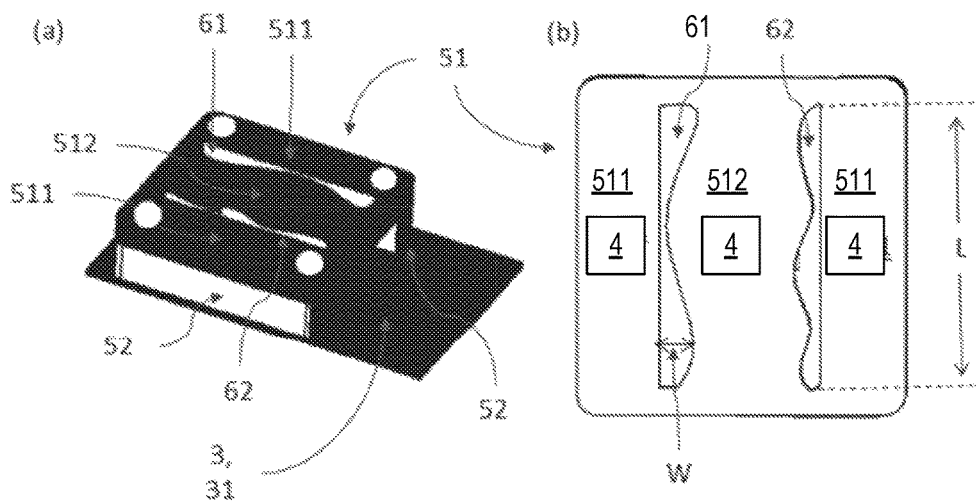

FIG. 5 shows another embodiment of the lighting arrangement 1 according to the present invention (a) in a perspective view and (b) in a top view of the optical sub-holder 51. The lighting arrangement comprises a holder 5 comprising an optical sub-holder 51 and a connecting sub-holder 52 connecting the optical sub-holder 51 with the support member 3. The LED lighting element 2 is arranged underneath the optical sub-holder 51 between the connecting sub-holders 52 and therefore not visible here. In this embodiment the stress release element 6 comprises two slits 61, 62 with widths W varying along the length L of the slit 61, 62. The varying slits may be adapted to an optical element 4 comprising two or more element parts each serving specific beam shaping functions, wherein also the specific element parts are separated from each other by the stress release element 61, 62.

Figure 6:
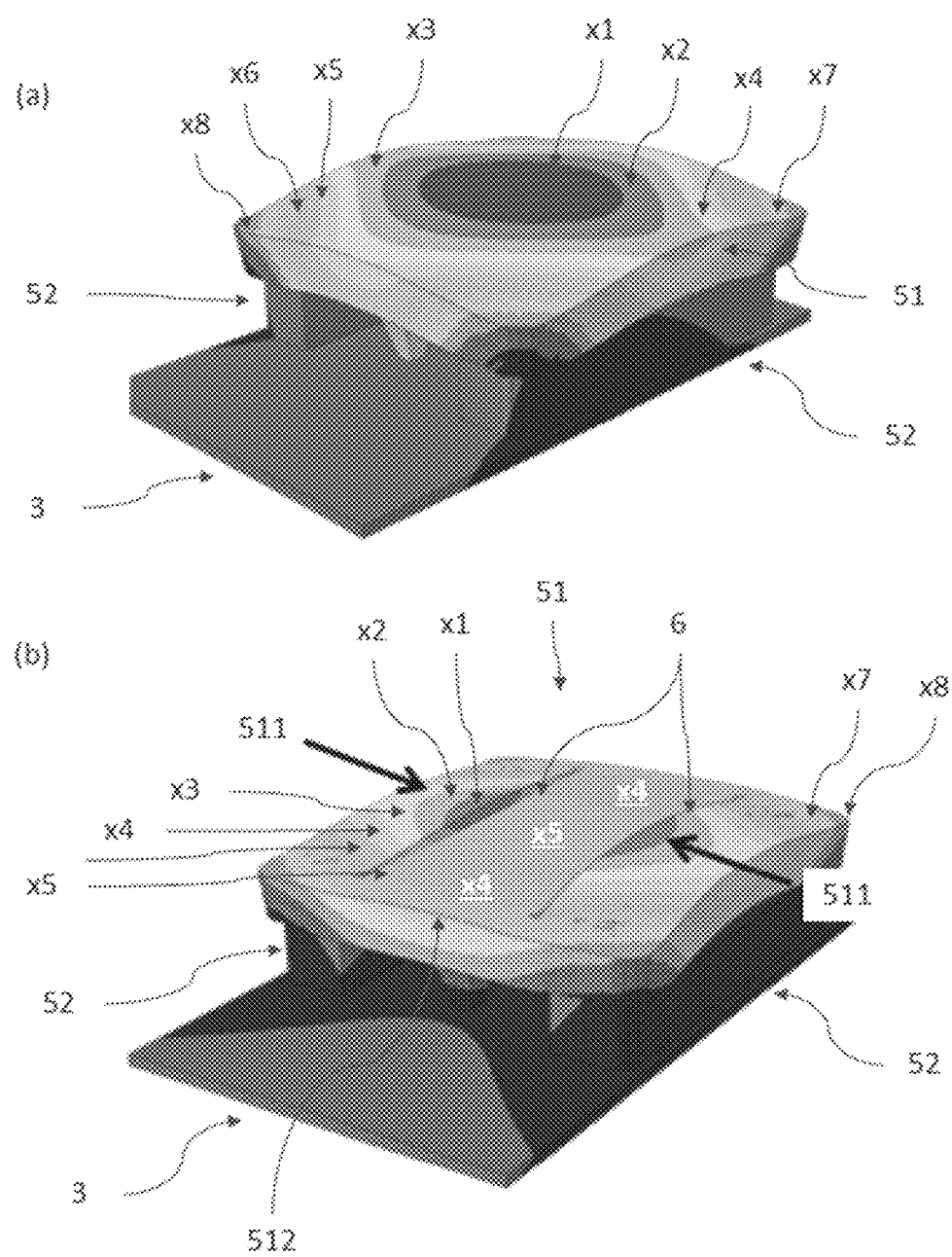

FIG. 6 shows the vertical displacement of lighting arrangements (a) according to prior art and (b) according to the present invention in a perspective view received from thermo-mechanical modelling of the assembly described above. In this model, interactions between all parts have been taken into account assuming a hard interaction in the direction normal to each interface in contact and interaction with a friction coefficient of 0.3 in the direction parallel to all interfaces in contact. For simplification, the applied load is a uniform temperature increment corresponding to the automotive environment temperature variation during operation. Free stress temperature of all the parts is assumed to be the assembly temperature i.e ambient temperature ~20° C. Parts are fixed together by bolts. Local tightening and squeezing of the material around the bolts are not taken into account in the model. The used mechanical properties for the simulation are given in table 1, where E denotes the Youngs module and CTZE the coefficient of thermal expansion.

TABLE 1 mechanical properties used for the modeling of vertical displacements

| Component | Material | E (MPa) | CTE (ppm/° C.) |
|---|---|---|---|
| Connecting sub-holder | LCP | 15.500 | 12 |
| Optical element and optical sub-holder | silicone | 16 | 250 |
| Support member | Cu IMS board | 130.000 | 16 |

Simulation results of the assembly are obtained for a positive temperature increment to an operating temperature of 125° C., where the vertical displacement values for the upper surface of the optical sub-holder 52 are represented by contour lines across the lighting arrangement, where each area is denoted by the reference signs x1-x8 for the local vertical displacement of 0.86<x1<0.78 mm<x2<0.70 mm<x3<0.62 mm<x4<0.54 mm<x5<0.46 mm<x6<0.38 mm<x7<0.30 mm x8<0.22 mm). Magnified deformation and vertical displacement after positive temperature increment occur due to the CTE mismatch between Silicone and LCP holder material. In FIG. 6a the optical sub-holder (and therefore also the optical element 4) is strongly shifted toward the vertical direction. The outer area of the optical sub-holder 51 is completely detached from the connecting sub-holder 51 only carrying the optical sub-holder on small areas at the corners. As a result, the optical element 4 is displaced toward the upward direction and the gap between support member 3 and bottom surface of the optical element 4 is increased from 500 μm to more than 930 μm. The displacement of the optical sub-holders 51 in z direction is compared between the reference configuration (FIG. 6a) and the configuration with the design according to the present invention (FIG. 6b). As it could be seen, the vertical displacement is much more reduced for the configuration with design according to the present invention. For example, after positive temperature increment, the gap between support member 3 and the optical element 4 is increased by more than 430 μm. However, for the configuration with design according to the present invention, the gap increase is only equal to 30 μm. The main part 512 remains nearly in its initial position while the outer parts 511 are significantly deformed by thermal stress induced by the temperature of 125° C. In conclusion, introduction of opening slits 61, 62 in the optical sub-holder 51 allows to release the stress driven by contact of material with high CTE mismatch near connection areas between connecting sub-holder 52 and optical sub-holder 51s. As a result, the outer parts of the optical element and optical sub-holder made of silicone is free to deform and the displacement of the outer part has no impact on the collimators area.

Figure 7:
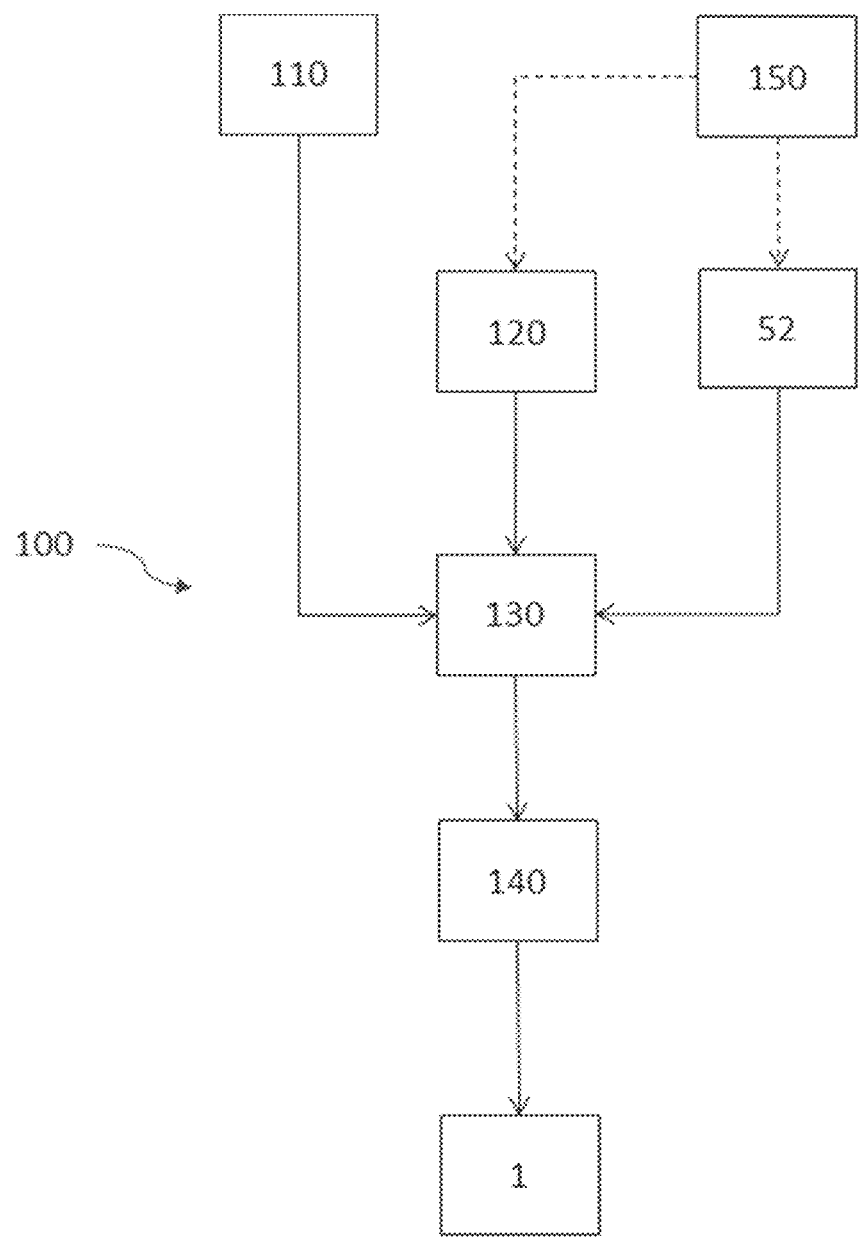

FIG. 7 shows an embodiment of the method 100 to manufacture a lighting arrangement 1 according to the present invention comprising the steps of providing 110 a support member 3 carrying at least one LED lighting element 2, providing 120 an optical sub-holder 51 carrying at least one optical element 4 to receive the light B emitted from the LED lighting element 2 and connecting 130 the optical sub-holder 51 via a connecting sub-holder 52 to the support member 3, where the optical sub-holder 51 and the connecting sub-holder 52 forming a holder 5, where the connecting sub-holder 52 is suitably shaped that the optical sub-holder 51 bridges the connecting sub-holder 52 to hold the optical element 4 in a desired position P1 relative to the LED lighting element 2 suitable to shape the received light B in a desired way. Here the support member might be a Cu IMS board with a coefficient of thermal expansion of 16 ppm/° C. or any other suitable material, the holder (optical sub-holder 51 and connecting sub-holder 52) might be made of LCP having a coefficient of thermal expansion of 12 ppm/° C. or any other suitable material and the optical element might be made of silicone, e.g. a silicone lens having a coefficient of thermal expansion of 250 ppm/° C. or any other suitable material. In an embodiment the holder 5 is manufactured 150 via injection moulding, transfer moulding or stamping (as indicated by the dashed arrows). In a further step at least one stress release element 6, 61, 62 is introduced 140 into the optical sub-holder 51 dividing the optical sub-holder 51 in one or more outer parts 511 connected to the connecting sub-holder 52 and a main part 512 carrying the optical element 4, where a mechanical connection 53 between the main part 512 and the one or more outer parts 511 is weakened by the stress release element 6, 61, 62 extending through the optical sub-holder 51 and having a suitable shape and length L to maintain the required mechanical connection 53 between the main part 512 and the one or more outer parts 511 suitable to carry the main part 512 and to enable the one or more outer parts 511 to deform freely in case of thermal stress and to maintain a main part position P2 of the main part 512 being closer to the desired position P1 compared to an outer part position P3 of the one or more outer parts 511. Here the stress release element 6, 61, 62 might be also introduced at least partly into the connecting sub-holder 52. In the embodiment shown here the step of introducing 140 the stress release element 6, 61, 62 is performed after having connected the optical sub-holder 51 to the connecting sub-holder 52.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS

1 Lighting arrangement
2 LED lighting element
21 Light emitting surface of the LED lighting element
3 Support member
31 (upper) surface of the support member
4 Optical element
5 Holder
51 optical sub-holder
511 outer part of the optical sub-holder
512 main part of the optical sub-holder
52 connecting sub-holder
521 supporting surface of the connecting sub-holder to support the optical sub-holder
53 mechanical connection between main part and outer part 6 stress release element
61, 62 slit (first and second)
100 method to manufacture the lighting arrangement 1
110 Providing a support member carrying the LED lighting element
120 Providing an optical sub-holder carrying the optical element
130 Connecting the optical sub-holder via the connecting sub-holder to the support member
140 Introducing the stress release element into the optical sub-holder
150 manufactured the holder via injection moulding, transfer moulding or stamping
A-B section plane for FIG. 3
B Light emitted from the LED lighting element
D2 first distance (between light emitting surface and optical element)
D3 distance between surface of support member and optical element
L length of the slit
OA optical axis
P1 Desired position of optical element and optical sub-holder
P2 main part position
P3 outer part position
W width of the slit
x1-x8 Positions with a certain vertical displacement with respect to the support member

The invention claimed is:

1. A lighting arrangement, comprising:
a support member;
at least one LED lighting element arranged on the support member;
at least one optical element to receive light emitted from the LED lighting element; and
a holder, comprising:
an optical sub-holder; and
a connecting sub-holder connecting the optical sub-holder with the support member;
wherein:
the connecting sub-holder is suitably shaped so that the optical sub-holder bridges the connecting sub-holder over the LED lighting element to carry the optical element in a desired position relative to the LED lighting element suitable to shape the received light in a desired way;
at least the optical sub-holder comprises at least one stress release element dividing the optical sub-holder in one or more outer parts connected to the connecting sub-holder and a main part carrying the optical element; and
a mechanical connection between the main part and the one or more outer parts is weakened by the stress release element extending through the optical sub-holder and having a suitable shape and length to maintain the required mechanical connection between the main part and the one or more outer parts suitable to carry the main part and to enable the one or more outer parts to deform freely in case of thermal stress while maintaining a main part position of the main part being closer to the desired position compared to an outer part position of the one or more outer parts.

2. The lighting arrangement in accordance with claim 1, wherein the stress release element is established by at least one open slit arranged between the main part and the connecting sub-holder.

3. The lighting arrangement in accordance with claim 2, wherein the slit has a width ranging between 100 μm and 5 mm.

4. The lighting arrangement in accordance with claim 2, wherein the width of the slit varies along the length of the slit.

5. The lighting arrangement in accordance with claim 2, wherein the slit is a vertical slit through the optical sub-holder.

6. The lighting arrangement in accordance with claim 2, wherein the stress release element comprises at least two separate slits arranged on both sides of the area of the optical sub-holder carrying the optical element, each slit being arranged in parallel to an edge of the connecting sub-holder holding the optical sub-holder facing towards the optical element.

7. The lighting arrangement in accordance with claim 1, wherein the stress release element further extends at least partly into the connecting sub-holder.

8. The lighting arrangement in accordance with claim 1, wherein the optical element is at least partly made of a transparent or translucent material.

9. The lighting arrangement in accordance with claim 1, wherein the optical element is arranged directly in front of a light emitting surface of the LED lighting element at a first distance along an optical axis along a main emission direction.

10. The lighting arrangement in accordance with claim 1, wherein the optical element comprises two or more element parts each serving specific beam shaping functions, wherein also the specific element parts are separated from each other by the stress release element.

11. The lighting arrangement accordance with claim 1, wherein the connecting sub-holder provides a supporting surface for the optical sub-holder, which is arranged at least on opposite sides of the LED lighting element in lateral direction parallel to the surface of the support member.

12. The lighting arrangement in accordance with claim 1, wherein the connecting sub-holder, the optical sub-holder, and the optical element are provided as a single piece element made of the same material.

13. A method to manufacture a lighting arrangement according to claim 1 comprising the steps of:
providing a support member carrying at least one LED lighting element,
providing an optical sub-holder carrying at least one optical element to receive the light emitted from the LED lighting element,
connecting the optical sub-holder via a connecting sub-holder to the support member, where the optical sub-holder and the connecting sub-holder form a holder, where the connecting sub-holder is suitably shaped that the optical sub-holder bridges the connecting sub-holder over the LED lighting element to carry the optical element in a desired position relative to the LED lighting element suitable to shape the received light in a desired way,
introducing at least one stress release element into the optical sub-holder dividing the optical sub-holder in one or more outer parts connected to the connecting sub-holder and a main part carrying the optical element, where a mechanical connection between the main part and the one or more outer parts is weakened by the stress release element extending through the optical sub-holder and having a suitable shape and length to maintain the required mechanical connection between the main part and the one or more outer parts suitable to carry the main part, to enable the one or more outer parts to deform freely in case of thermal stress, and to maintain a main part position of the main part closer to the desired position compared to an outer part position of the one or more outer parts.

14. The method according to claim 13, wherein the step of introducing the stress release element is performed after having connected the optical sub-holder to the connecting sub-holder.

15. The method according to claim 13, wherein the stress release element is also introduced at least partly into the connecting sub-holder.

16. The method according to one of claim 13, wherein the holder is manufactured via injection moulding, transfer moulding or stamping.

* * * * *